May 18, 1926.
J. J. CHAMPLIN
1,585,462
SWEEP RAKE
Filed March 28, 1925   3 Sheets-Sheet 2
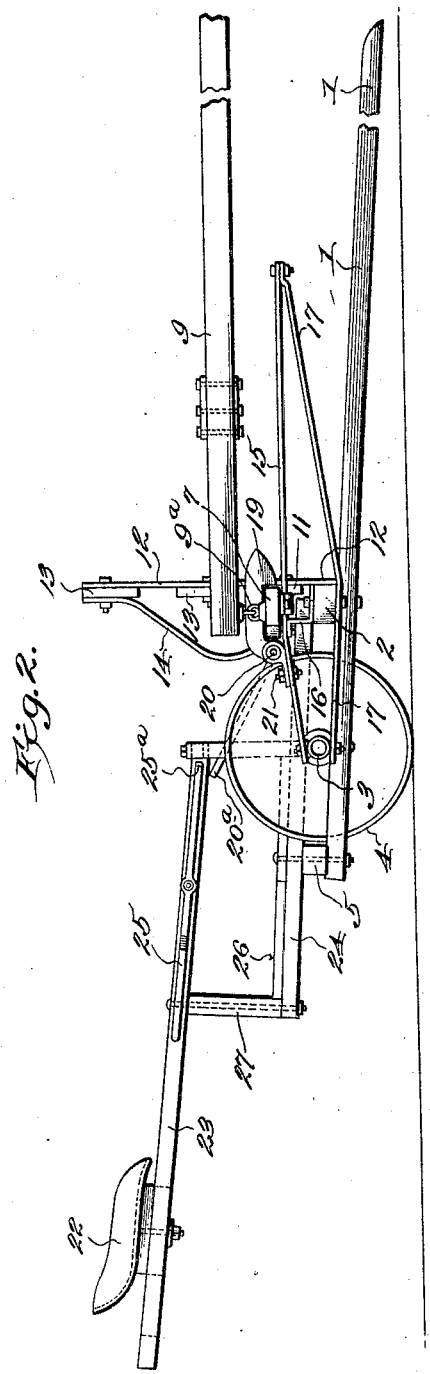
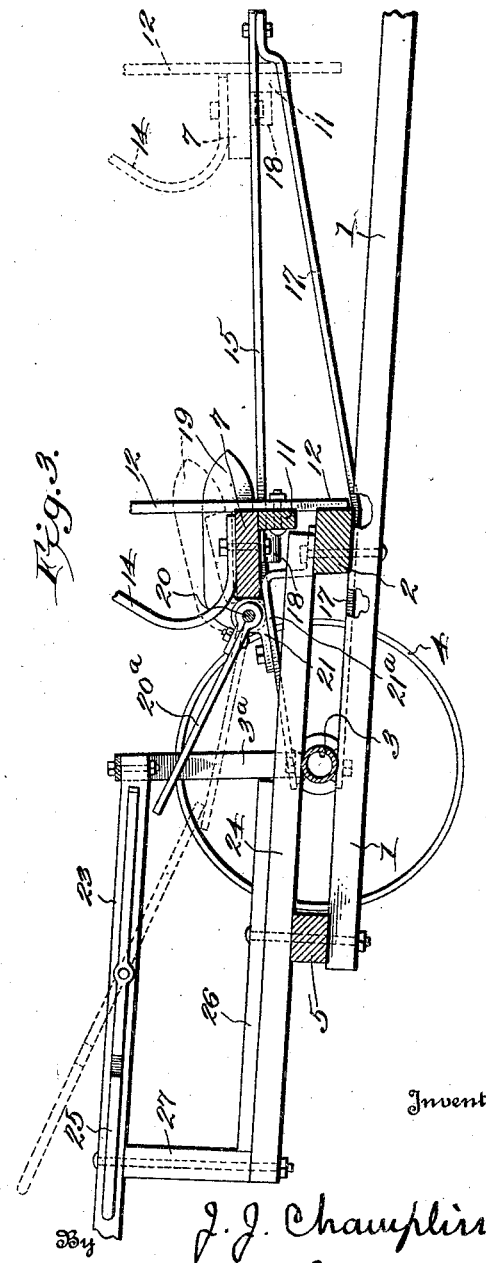
Inventor
J. J. Champlin
By Hubert E. Peck, Attorney

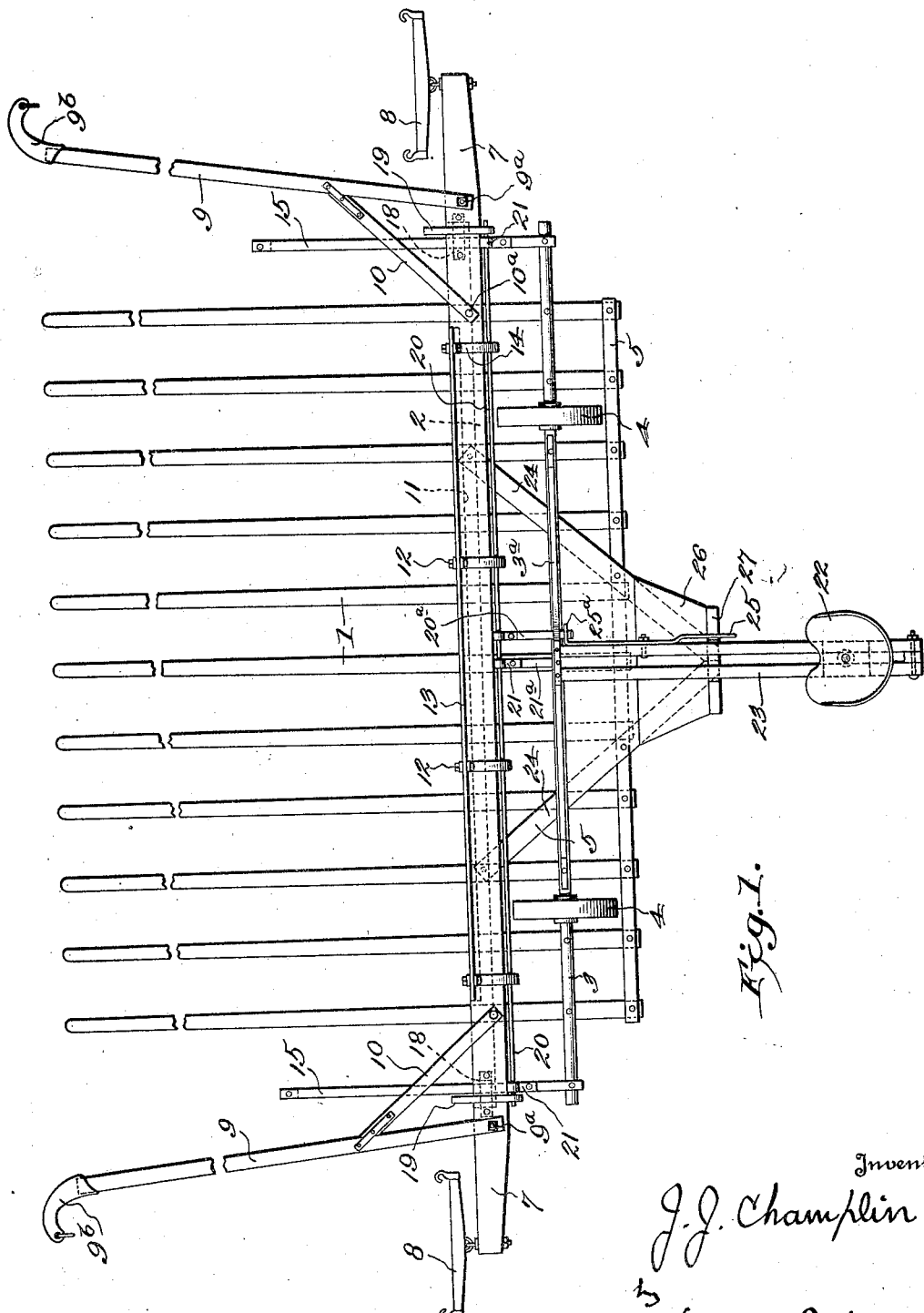

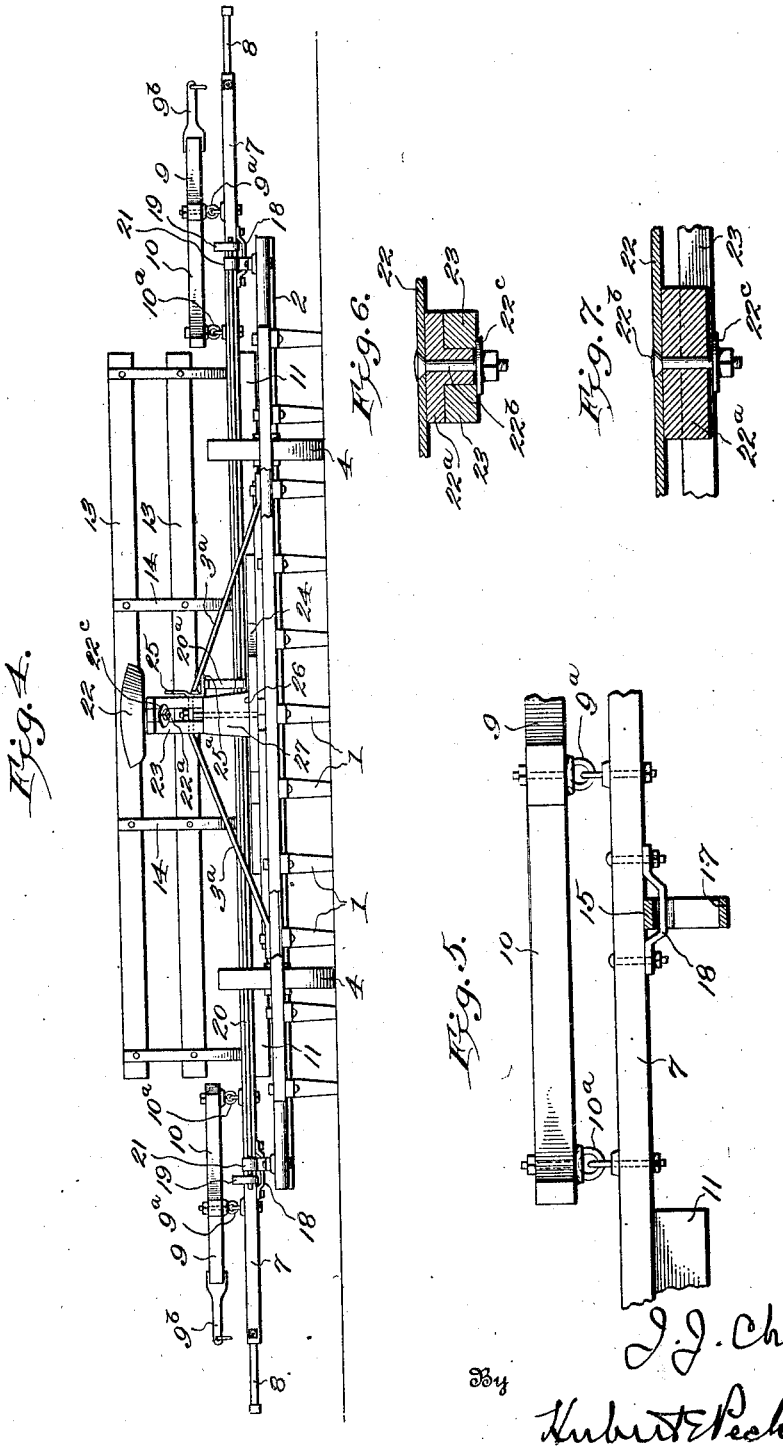

Patented May 18, 1926.

1,585,462

UNITED STATES PATENT OFFICE.

JAY J. CHAMPLIN, OF BEATRICE, NEBRASKA.

SWEEP RAKE.

Application filed March 28, 1925. Serial No. 18,990.

This invention relates to so-called sweep rakes or hay sweeps; and the objects and nature of the invention will be readily understood by those skilled in the art in the light of the following explanations of the accompanying drawings that illustrate what I now believe to be the preferred mechanical expressions or embodiments of my invention from among other forms, constructions and arrangements within the spirit and scope thereof.

My present invention is designed to improve the hay sweep disclosed by my Patent No. 1,344,863 dated June 29, 1920, for the purpose of correcting certain difficulties encountered in the actual use thereof, and for other purposes.

The unloading or hay sweeping member of the embodiment of my patent is provided with guiding and controlling devices that require the head of such member to maintain throughout its fore and aft movements a position more or less accurately at right angles to the direction of such movements to avoid wedging or jamming of such devices. This requirement necessitates approximate uniform fore and aft positions of the draft animals as they advance to propel said member on its forward movement with respect to the hay gathering rake that carries said member. In other words, if one draft animal advances more rapidly than the draft animal on the opposite side of the implement, or if one assumes a position in advance of the other, said member is put under tension or tendency to assume an angular position that places said devices under lateral strain or stresses with a consequent tendency to lock or wedge and prevent relative forward movement of the unloading device or that results in breakage or other damage. It is exceedingly difficult, if not in actual practice impossible, to keep the draft animals in uniform fore and aft positions while they are advancing the sliding head that constitutes the unloading device. The embodiment of my said patent presents certain other difficulties.

It is an object of my present invention to provide a sweep rake with a hay unloading slidable head or member that embodies a draw bar, for the draft animals, forming the head or major frame element of said member, and wherein said member is so more or less loosely assembled with or coupled to the rake as to freely move on its relative fore and aft strokes regardless of the ordinary relative fore and aft positions of the draft animals and the consequent angular positions assumed by the member with respect to the rake.

A further object of the invention is to provide a sweep or gathering rake with an improved unloading device that is drawn forward relative to the rake by the forward movement of the draft animals and that is so guided and loosely coupled to the rake as to be capable of assuming various angular positions while advancing without disadvantageously acting on its free forward movement with respect to the rake.

A further object of the invention is to provide certain improvements in combinations, arrangements and constructions with the end in view of providing an exceedingly advantageous and efficient sweep rake.

With these and other objects in view, my invention consists in certain novel features in construction and in combinations and arrangements as more fully and particularly set forth and specified hereinafter.

Referring to the accompanying drawings forming a part hereof:

Fig. 1 is a top plan of the implement, dotted lines showing certain hidden parts.

Fig. 2 is an end elevation.

Fig. 3 is a detail vertical longitudinal sectional view, dotted lines showing certain parts in different positions.

Fig. 4 is a rear elevation of the implement.

Fig. 5 is a detail view showing the loose couplings joining a tongue and its brace to the draw bar.

Fig. 6 is a detail cross section through the sliding seat and the fixed seat support.

Fig. 7 is a detail longitudinal section of the fixed seat support and the sliding seat.

In the particular embodiment illustrated as an example for purposes of explanation, the rake or hay gatherer proper, comprises the spaced parallel forwardly-projecting straight tines or teeth 1; the main frame cross bar 2; the fixed axle 3, on which the supporting ground wheels 4 are mounted; the main frame rear cross bar 5, and a suitable support for the driver or operator.

In this example, the tines 1 traverse the under side of the front frame bar 2 and are bolted or otherwise fixed thereto, and project rearwardly therefrom and traverse the under side of the axle 3 to which they are bolted or otherwise fixed. The axle 3, is usually composed of pipe, and in view of the length thereof is, preferably, braced against sagging between the supporting wheels 4, by the arched truss 3ª.

The tines extend rearwardly beyond the axle and at their ends fit the under side of the rear cross bar 5 to which they are fixed as by bolts. The tines are thus extended rearwardly and are rigidly connected by the parallel spaced bars 2, 5, and axle 3, with the axle located about midway between the two bars. A most strong stiff construction is thereby provided.

This gathering rake is provided with draft appliances whereby the implement is propelled forward in such manner that the rake tines will gather a load of hay and convey the same as the implement is propelled to the hay stacker designed to pick up the load and deposit the same on the stack.

The hay sweep or gathering rake is equipped with a head arranged transversely of the tines and upstanding therefrom, to constitute the rake head or abutment for the load of hay gathered by the tines, and in the example illustrated this head is slidable fore and aft of the implement and constitutes an unloading device by which the load of hay on the tines can be pushed forwardly thereon to the proper position and condition for picking up by the hay stacker. This slidable head is normally locked or otherwise held at its limit of rearward movement with respect to the tines to perform its normal sweep rake head functions during the hay gathering and conveying operations. When the sweep rake is ready for unloading, said head is released so that it can be advanced with respect to the tines to perform the unloading operation.

The draft is applied to the sweep rake through the medium of said rake head, and hence when the head is released the head is drawn by the draft to perform the unloading operation, while the sweep rake, otherwise, remains at rest.

Said head that constitutes the unloading device, embodies a long strong rigid head bar 7 forming and constituting the draw bar of the implement and arranged transversely thereof and projecting at both ends laterally beyond the series of tines. This draw bar in length hence exceeds the width of the rake proper, and the projecting draw bar ends are equipped with single trees 8, or other suitable draft attachments for the attachment of the draft animals located laterally beyond opposite sides of the rake.

The two tongues 9, for the draft animals are also located laterally beyond the opposite sides of the rake proper and diverge forwardly from the opposite end portions of the draw bar 7 to which the rear ends of the tongues are loosely hinged or coupled by intermeshing eye bolts 9ª, to permit free vertical swing of the tongues. The tongues at their front ends are equipped with any suitable means for attachment to the draft animal collars, for instance I show suitable hitch brackets or castings 9ᵇ, for this purpose.

The tongues are held against independent lateral movement with respect to the draw bar, by any suitable means. For instance, I show stiff diagonal braces 10 between the tongues and draw bar for this purpose. Each brace 10, at its outer end, is rigidly bolted or otherwise fixed to its tongue 9, and from thence extends laterally and rearwardly to an intermediate portion of the length of the draw bar to which it is hinged (for vertical swing) by intermeshing eye bolts 10ª.

The rear ends of the tongues 9 and the braces 10, that are rigid with the tongues, are preferably located transversely of and a distance above the draw bar 7 to which they are hinged to swing vertically by any suitable means, for instance, such as the eye bolts 9ª, 10ª, which eye bolt connections preferably support the rear ends of the tongues and braces spaced upwardly distances from the top surface of the draw bar.

Throughout the major portion of its length, the draw bar is preferably, braced and stiffened against springing by the relatively short bar 11.

In the example shown, the stiffener bar 11, is rigid as well as parallel with the draw bar and depends from the front portion of the underside of the draw bar and at its ends terminates short of the draw bar end portions.

This draw bar constitutes a part of and carries a vertical framework to cooperate with said bar in forming the rake head. In the particular example illustrated, this vertical framework of the rake head is composed of spaced vertical posts or uprights 12, rigid with and supported by the draw bar and depending therefrom as well as projecting upwardly therefrom and carrying elevated horizontal spaced cross slats 13 fixed to said uprights 12, and rear upright stiffening brackets or braces 14, fixed to the draw bar 7 and to the top cross slat and upper ends of posts 12. The posts are shown bolted to stiffening bar 11 which can be in the same vertical plane as the slats 13 and thus form part of the hay abutting wall or framework.

The sweep rake head that includes the draw bar, is slidably supported in an elevated position a distance above and independently of the rake tines 1, by suitable relatively fixed straight slide rails 15 rigid with and supported by the rake frame and projecting forwardly therefrom at a level a considerable distance above the levels of the rake tines 1, and the frame cross bar 2, In the particular example illustrated, I provide two parallel stiff rigid slide rails 15, projecting forwardly from the opposite end portions of the frame cross bar 2, and under the opposite end portions of the draw bar 7, in such manner that the under side of the draw bar rests on the top edges of said rails. Each rail extends over, usually a distance above, the frame bar 2 and is fixed thereto and extends rearwardly to the axle 3 to which it is bolted or otherwise fixed. The rear portions of the rails usually rest on and are bolted to rigid brackets or posts 16 fixed to and rising from the frame bar 2, to attain the desired elevated position of the draw bar of the sweep rake head that rests on said slide rails.

These forwardly projecting rigid slide rails 15, are preferably stiffened and braced by under bars or braces 17, at their portions traversing the under sides of the axle 3 and frame bar 2 and bolted or otherwise fixed thereto and at their front ends meeting and rigid with the front ends of the rails 15, as by being bolted or riveted thereto. These braces are inclined upwardly and forwardly to meet the front ends of the rails and are otherwise, in this instance, spaced downwardly from the rails.

Any suitable means or devices are provided to more or less loosely confine the draw bar and consequently the sweep rake head to the fixed slide rails against accidental detachment therefrom or undue relative upward and longitudinal movements. For instance, as an example of means for this purpose, I show elongated hold down loops 18, one for each rail, each at its ends fixed to the under side of the draw bar and partially embracing or extending under a rail. These rigid loops 18 are elongated longitudinally of the draw bar and transversely with respect to the rails to more or less loosely hold the draw bar to the rails while permitting relative longitudinal play and movement of the draw bar transversely of the rails and various angular positioning of the draw bar with one end in advance of the other, without causing binding or locking of the loops on the rails against sliding movement of the bar longitudinally along the rails.

The draw bar (consequently the hay sweep head) is normally held at its limit of rearward movement with respect to the gathering rake proper and is operatively coupled thereto to transmit the draft to the rake.

To this end, the draw bar is normally located at its limit of rearward movement, i. e., above the frame bar 2 at the rear end portions of the rails. The sweep rake head is thus held at its normal rear position on the rake proper by suitable means through which the draft is transmitted to the rake proper and by which the head can be released to slide forward on its unloading stroke. For instance, for this purpose, I show several elongated vertically swingable dogs or latches 19 having their free ends beveled downwardly and rearwardly to their locking shoulders. The dogs are fixed to and project forwardly from an elevated rock shaft 20, carried by and mounted in several bearing boxes or brackets 21, fixed on the rear downwardly inclined portions of the fixed slide rails 15 and at the center on a bracket 21ª, fixed to bar 2 and axle 3, see Fig. 3. This latch rod or shaft 20, is provided with an operating lever 20ª, by which the shaft can be rocked to elevate the latches 19, from operative holding position with respect to the hay sweep head. These latches, in their normal operative positions, rest on the top side of the draw bar and extend forwardly across said bar and depend in front thereof and thus lock the bar against relative forward movement, and also transmit the draft from said bar to the sweep rake.

When the rake has gathered the load of hay which rests on the rake tines and against the rake head, and has arrived at the desired position with respect to the hay stacker to deliver the load thereto, the operator by suitable means, rocks shaft 20, to lift the latches 19, from operative position with respect to the draw bar. While the latches are thus held elevated, the draft animals are caused to advance, thereby drawing the rake head forwardly, during which forward movement, the draw bar slides forwardly on the elevated fixed slide rails, which forward movement can continue until the hold-down loops 18 abut the joint between the front ends of said rails and their braces 17.

After delivery of the load of hay, the rake head can be forced to slide back on said rails to its normal position, at its limit of rearward movement usually with the draw bar abutting bearing brackets 21, in which position it is locked by the latches, as before described, in normal operative rake-head constituting position with respect to the sweep rake.

From the foregoing, it will be noted that the rake head is free to easily and properly perform its hay sweeping stroke, regardless of the reasonable angular position of the draw bar resulting from the common irregular positioning of the draft animals, one in advance of the other, or otherwise.

An exceedingly simple sturdy structure is provided wherein the rake head including the draw bar are supported in the desired elevated position above and independently of the rake tines, in such a manner that said slidable head is free, loose or flexible with respect to its support, to assume various angular positions with either end in advance of the other while freely sliding longitudinally of the elevated supporting rails, and furthermore, the tongues are free to swing verically with respect to such rake head.

In the particular example illustrated, a support for the driver or operator is provided, that includes a rearwardly extending V frame rigid with the sweep rake main frame. This V frame comprises a pair of fixed rigid rearwardly converging bars 24 arranged midway the width of the implement and meeting or approximately meeting at their rear ends rearwardly beyond the rear frame bar 5. These bars 24 rest on and are fixed to the front and rear frame bars 2, 5, and the axle 3, and support an operator's platform 26, resting on and fixed to said bars. An operator's seat, and support therefor, are also provided. The seat support is elevated and rearwardly elongated approximately in the line of the longitudinal center line or axis of the implement, and carries a seat 22 for the operator that is slidable longitudinally of the support. The operator with his feet on the platform 26, can hence move the seat 22 forwardly or rearwardly to control the vertical position of the front ends of the tines. During such shifting of the implement balancing weight of the operator, the implement fulcrums or rocks vertically on the axis of the wheels 4, to raise and lower the front end of the rake. In the example shown, the seat support embodies a pair of parallel spaced elevated rearwardly extending seat bars 23 rigid with the main frame of the sweep rake, and at their front ends fitted under the central elevated portion of the axle truss 3ª and rigidly bolted or otherwise fixed thereto, and between their ends resting on and fixed to an upright post or frame 27 fixed to and rising from the rear ends of bars 24.

The seat 22 rests on bars 23 and is slidable longitudinally thereof, and is confined thereto by any suitable means. For instance, I show seat block 22ª, on which the seat proper is mounted. This block of the seat is slidable on said bars and depends between the same (the longitudinal seat support in this instance having a longitudinal slot provided by the spacing between bars 23) and is confined to the bars by vertical bolt 22ᵇ and its nut and confining plate or washer 22ᶜ.

I preferably arrange a vertically swingable lever 25 approximately longitudinally of the seat support 23, and between its ends fulcrumed to said support in such manner that the rear handle end of the lever is readily accessible to the operator located on the seat 22, while the front end of said lever is provided with a transversely arranged operating or striking end 25ª, located over the free end of lever in operative relation with respect thereto to depress lever 20ª, to elevate dogs 19 and release the sliding head of the sweep rake, when the handle end of lever 25 is swung up.

It is evident that various changes, modifications and variations might be resorted to without departing from the spirit and scope of my invention and hence I do not wish to limit myself to the exact disclosures hereof.

What I claim is:

1. A sweep rake provided with fixed elevated forwardly projecting slide rails, and a head supported thereby independently of the rake tines and freely slidable on said rails and loosely and flexibly coupled thereto to assume various angular positions while freely sliding longitudinally thereof, and draft attachments including tongues coupled to said head and independently swingable vertically.

2. A sweep rake provided with a head embodying a draw bar at its ends having draft animal attachments and tongues hinged thereto to swing vertically, and means, whereby said head is loosely supported in an elevated position independently of the rake tines and freely slidable longitudinally of said rake and to various angular positions, on its sweeping movement.

3. A sweep rake provided with a hay unloading head embodying a draw bar forming a fixed portion of the head, said bar at its opposite ends having draft attachments and also having tongues coupled thereto against relative lateral swing and swingable vertically with respect to said bar, and means whereby said head is loosely and slidably supported in an elevated position with respect to and independently of the rake tines and whereby said bar is freely slidable forwardly and rearwardly with respect to said rake on its sweeping movements and to various angular positions during such movements.

4. In combination in a sweep rake, forwardly extending slide rails fixed to the rake frame and elevated above the rake tines, a draw bar provided with a head, said draw bar being supported by said rails and loosely confined thereto to freely assume various angular positions as it slides longitudinally of said rails, and means for detachably locking said bar in its normal position.

5. In combination, in a sweep rake, fixed slide rails, an unloading head supported by said rails independent of the rake tines and embodying a draw bar slidable freely on said rails and loosely coupled thereto, and tongues hinged to said bar for relative vertical swing.

6. A sweep rake comprising a draw bar provided with end tongues hinged thereto for vertical swing, means for detachably locking the draft bar to the rake in normal position, fixed upright and cross slats carried by the draft bar, and means for supporting said draft bar in an elevated position above and independently of the rake tines and for permitting free sliding of the draft bar in various angular positions on its sweeping movement.

7. A sweep rake comprising an unloading head slidable longitudinally of the rake proper on its sweeping movement and provided with hold-down means permitting the head to freely assume various angular positions during such sliding motion, means supporting said head independently of the rake tines and draft animal attachments applied to the projecting ends of such head.

8. A sweep rake comprising main frame bars, forwardly projecting hay gathering tines, and a wheel support, slide rails fixed to the main frame and projecting forwardly therefrom, and an unloading head slidably mounted on and supported by said rails and having projecting ends provided with draft attachments, means for detachably locking said head in normal position, and hold-down devices loosely confining the head to the rails to permit the head to assume freely various angular positions during its free forward sliding movement on the rails.

9. A sweep rake comprising a wheeled frame and hay gathering tines and a forwardly projecting supporting slideway for an unloading head, and an unloading head supported entirely by said slideway and having draft attachments and means loosely coupling the head to said slideway to permit the head to freely assume angular positions with either end in advance of the other during the free longitudinal sliding movement of the head along said slideway.

10. A sweep rake comprising a fixed rear axle having supporting wheels, a front frame bar, hay gathering tines fixed to the bar and axle, rigid forwardly projecting slide rails fixed on said bar and axle and elevated with respect to said tines, a draw bar slidably supported by said rails and provided with draft attachments, said bar provided with and carrying an unloading head, said draw bar and head being supported entirely by said rails, said bar provided with means projecting under said rails to loosely and freely confine the bar thereto, and means for detachably locking the draw bar in its normal rear position and whereby it can be released to slide forwardly on said rails.

11. A sweep rake provided with fixed forwardly projecting slide rails having stops at their outer ends, an unloading head slidably supported by said rails free of the rake tines and embodying a long draw bar slidable on said rails and provided with longitudinally elongated hold down loops extending loosely under said rails, draft attachments applied to the end portions of the bar, and means for detachably holding said head in its normal rearward position.

12. A sweep rake having forwardly projecting inclined hay gathering tines, and provided with a relatively slidable unloading head loosely confined thereto to freely assume various angular positions with either end in advance of the other as it freely advances on its hay sweeping stroke, said head projecting laterally at both ends and having draft attachments applied thereto, said unloading head being supported free and independently of said tines, tongues hinged to said head for relative vertical swing, and draft-transmitting means for detachably locking said head in its normal operative position with respect to the rake.

13. A sweep rake having hay gathering tines, and provided with an unloading head mounted and supported independently of said tines and slidable longitudinally of the rake and detachably locked in normal operative position, said head embodying a single long straight draw bar of greater length than the width of the rake and having draft attachments beyond opposite sides of the rake, tongues at opposite sides of the rake having inclined side braces rigid therewith, said tongues and their braces traversing said straight draw bar with both tongues and braces hinged to said bar to swing vertically with respect to said bar and to hold said tongues against lateral swing with respect to said bar.

14. A sweep rake provided with a freely slidable and loosely confined unloading head normally detachably held at its limit of relative rearward movement, said head being supported and slidable entirely independently of and free from the rake tines, said head comprising a long draw bar having end draft attachments and swingable tongues and provided with a stiffener bar and rigid upright posts, cross slats and upright rear braces.

15. A sweep rake having forwardly extending depressed hay gathering tines, and provided with fixed elevated forwardly projecting slide rails, and an unloading device formed by a slidable head supported entirely by said rails and freely slidable thereon, and loosely and flexibly coupled thereto to assume various angular positions while sliding longitudinally thereof, and draft attachments coupled to said slidable head.

16. A sweep rake having hay gathering tines, and provided with an unloading device formed by a slidable head, embodying a draw bar at its ends having draft animal attachments, and means separate from said tines whereby said device is loosely supported and freely slidable longitudinally of said rake and to various angular positions on its sweeping movement.

Signed at Beatrice, Gage County, Nebraska, this 23rd day of March, 1925.

JAY J. CHAMPLIN.